(12) United States Patent
Blackwood et al.

(10) Patent No.: US 9,032,668 B2
(45) Date of Patent: May 19, 2015

(54) SEAL WITH PRIMARY AND SECONDARY SEALING LOBES FOR USE IN ROLL-UP DOOR APPLICATIONS

(71) Applicant: Press-Seal Gasket Corporation, Fort Wayne, IN (US)

(72) Inventors: Graham E. Blackwood, Fort Wayne, IN (US); Michael R. Miller, Churubusco, IN (US); John M. Kaczmarczyk, Angola, IN (US)

(73) Assignee: Press-Seal Gasket Corporation, Fort Wayne, IN (US)

(*) Notice: Subject to any disclaimer, the term of this patent is extended or adjusted under 35 U.S.C. 154(b) by 0 days.

(21) Appl. No.: 14/012,077

(22) Filed: Aug. 28, 2013

(65) Prior Publication Data

US 2014/0069018 A1    Mar. 13, 2014

Related U.S. Application Data

(60) Provisional application No. 61/697,937, filed on Sep. 7, 2012, provisional application No. 61/779,336, filed on Mar. 13, 2013.

(51) Int. Cl.
*E06B 7/23* (2006.01)
*B60J 10/00* (2006.01)
*B62D 65/08* (2006.01)
(Continued)

(52) U.S. Cl.
CPC ............ *E06B 7/2314* (2013.01); *B60J 10/0062* (2013.01); *B60J 10/0088* (2013.01); *B60J 10/081* (2013.01); *B60J 5/14* (2013.01);
(Continued)

(58) Field of Classification Search
USPC ............ 49/475.1, 479.1, 480.1, 484.1, 495.1, 49/489.1, 493.1, 490.1, 496.1, 499.1; 160/40, 201
See application file for complete search history.

(56) References Cited

U.S. PATENT DOCUMENTS

| 1,763,603 | A | 6/1930 | Donahue |
| 2,575,793 | A | 11/1951 | Bush |

(Continued)

FOREIGN PATENT DOCUMENTS

| DE | 103 10 101 | 9/2004 |
| EP | 0 178 064 | 4/1986 |

OTHER PUBLICATIONS

International Search Report and Written Opinion dated Dec. 23, 2011 in corresponding International Application No. PCT/US2011/04557.

(Continued)

*Primary Examiner* — Katherine Mitchell
*Assistant Examiner* — Marcus Menezes
(74) *Attorney, Agent, or Firm* — Faegre Baker Daniels LLP (57) ABSTRACT

A roll-up door seal that may be monolithically formed from a single material of uniform density. The seal is sized and adapted to assemble to a standard roll-up door frame without a separate or dedicated frame structure. The seal provides redundant sealing surfaces, positioned to cooperate with both the door and door frame, which ensure an effective and durable fluid tight seal between the cargo space enclosed by the roll-up door and the ambient environment. The seal may be produced by extrusion from a flexible, weather resistant material such as EPDM, thereby providing a low cost solution for sealing roll-up doors having industry standard door frame constructions. The seal is firmly engageable with the door frame, such that the seal may be installed with little or no secondary fixation.

15 Claims, 7 Drawing Sheets

(51) Int. Cl.
B60J 10/08 (2006.01)
E06B 9/58 (2006.01)
B60J 5/14 (2006.01)

(52) U.S. Cl.
CPC .............. *E06B 7/2305* (2013.01); *E06B 9/582* (2013.01); *E06B 2009/588* (2013.01)

(56) References Cited

U.S. PATENT DOCUMENTS

| | | | |
|---|---|---|---|
| 2,591,833 A | 4/1952 | Kreimendahl | |
| 2,593,305 A | 4/1952 | Hunter | |
| 2,647,792 A | 8/1953 | Flemming | |
| 2,811,406 A | 10/1957 | Moore et al. | |
| 2,827,114 A | 3/1958 | Stroup | |
| 2,912,727 A | 11/1959 | Sehn | |
| 3,056,451 A | 10/1962 | Federline et al. | |
| 3,076,499 A | 2/1963 | Zoll et al. | |
| 3,161,925 A | 12/1964 | Bertolini | |
| 3,174,793 A | 3/1965 | Nallinger et al. | |
| 3,198,242 A | 8/1965 | Crosswell | |
| 3,339,619 A | 9/1967 | Crosswell | |
| 3,424,222 A | 1/1969 | Stoner et al. | |
| 3,456,390 A | 7/1969 | Hulverson et al. | |
| 3,518,792 A | 7/1970 | Williamson et al. | |
| 3,693,693 A * | 9/1972 | Court | 160/195 |
| 3,717,955 A | 2/1973 | Urbanick | |
| 3,784,243 A | 1/1974 | Pastva, Jr. | |
| D233,033 S | 10/1974 | Donne | |
| 3,886,686 A | 6/1975 | Urbanick | |
| 4,001,974 A | 1/1977 | Wright | |
| 4,006,562 A | 2/1977 | Belanger et al. | |
| 4,010,573 A | 3/1977 | Andrzejewski | |
| 4,015,368 A | 4/1977 | Court et al. | |
| 4,085,966 A | 4/1978 | Ringe | |
| 4,119,325 A | 10/1978 | Oakley et al. | |
| 4,288,135 A | 9/1981 | Buchser et al. | |
| D263,749 S | 4/1982 | Sorensen | |
| 4,447,065 A | 5/1984 | Dupuy et al. | |
| 4,527,807 A | 7/1985 | Urbanick | |
| 4,586,552 A | 5/1986 | Labelle | |
| 4,643,239 A | 2/1987 | Wentzel | |
| 4,656,785 A | 4/1987 | Yackiw | |
| 4,678,227 A | 7/1987 | Castagno | |
| 4,769,947 A | 9/1988 | Ogawa et al. | |
| 4,900,040 A | 2/1990 | Miller | |
| 4,910,918 A | 3/1990 | Naples et al. | |
| 4,928,431 A | 5/1990 | Kuzuhara et al. | |
| 4,957,301 A * | 9/1990 | Clay et al. | 277/345 |
| 5,107,622 A | 4/1992 | Fuchs et al. | |
| 5,172,744 A | 12/1992 | Finch et al. | |
| 5,398,451 A | 3/1995 | Mesnel | |
| 5,423,147 A | 6/1995 | Depuy | |
| 5,435,104 A * | 7/1995 | Dietrich | 49/493.1 |
| 5,493,814 A | 2/1996 | Christian | |
| 5,499,475 A | 3/1996 | Court et al. | |
| 5,511,343 A | 4/1996 | Guillon | |
| 5,538,317 A | 7/1996 | Brocke et al. | |
| 5,626,383 A | 5/1997 | Lee et al. | |
| 5,970,659 A | 10/1999 | Oord | |
| 6,021,609 A | 2/2000 | Teishi | |
| 6,098,696 A * | 8/2000 | Styra | 160/201 |
| 6,117,265 A | 9/2000 | Cittadini et al. | |
| 6,158,171 A | 12/2000 | Kellogg et al. | |
| 6,273,433 B1 | 8/2001 | Yu | |
| 6,374,567 B1 * | 4/2002 | Mullet | 52/716.1 |
| 6,405,489 B1 | 6/2002 | Miura | |
| 6,478,308 B1 | 11/2002 | McMillin et al. | |
| 6,527,278 B1 | 3/2003 | Norris | |
| 6,598,347 B2 | 7/2003 | Hattori | |
| 6,640,499 B2 | 11/2003 | Yamashita et al. | |
| 6,725,605 B2 | 4/2004 | Schlachter et al. | |
| 6,772,560 B2 * | 8/2004 | Dischiant et al. | 49/496.1 |
| 6,772,561 B1 * | 8/2004 | Berger, Jr. | 49/496.1 |
| 6,777,068 B2 | 8/2004 | Teramoto et al. | |
| 6,802,666 B1 | 10/2004 | Bormann et al. | |
| 6,996,936 B1 | 2/2006 | Maass | |
| 7,025,105 B2 | 4/2006 | Lancina | |
| 7,128,123 B2 | 10/2006 | Mullet et al. | |
| 7,306,839 B2 | 12/2007 | Kubo et al. | |
| 7,578,098 B2 | 8/2009 | Furuzawa et al. | |
| 8,146,985 B2 | 4/2012 | Nelson | |
| 8,157,270 B2 | 4/2012 | Tsou et al. | |
| 8,272,178 B2 | 9/2012 | Pardue et al. | |
| 2001/0008058 A1 | 7/2001 | Kawai et al. | |
| 2001/0034977 A1 | 11/2001 | Hattori | |
| 2002/0026751 A1 | 3/2002 | Kawai et al. | |
| 2002/0139054 A1 | 10/2002 | Schlachter et al. | |
| 2004/0250474 A1 | 12/2004 | Kubo et al. | |
| 2005/0161172 A1 * | 7/2005 | Rekret | 160/201 |
| 2005/0193636 A1 | 9/2005 | Jyawook et al. | |
| 2007/0245635 A1 | 10/2007 | Deguchi et al. | |
| 2009/0000205 A1 * | 1/2009 | Bright et al. | 49/489.1 |
| 2012/0304543 A1 * | 12/2012 | Preising et al. | 49/495.1 |

OTHER PUBLICATIONS

Non-Final Office Action dated Apr. 3, 2013 in U.S. Appl. No. 13/193,268.

Final Office Action dated Nov. 22, 2013 in U.S. Appl. No. 13/193,268.

* cited by examiner

FIG_3

FIG_4

SEAL WITH PRIMARY AND SECONDARY SEALING LOBES FOR USE IN ROLL-UP DOOR APPLICATIONS

CROSS REFERENCE TO RELATED APPLICATIONS

The present application claims the benefit under Title 35, U.S.C. Section 119(e) of U.S. Provisional Patent Application Ser. No. 61/779,336, filed Mar. 13, 2013 and entitled ROLL-UP DOOR SEAL, which claims the benefit of U.S. Provisional Patent Application Ser. No. 61/697,937, filed Sep. 7, 2012 and entitled ROLL-UP DOOR SEAL, the entire disclosures of which are hereby expressly incorporated herein by reference.

BACKGROUND

1. Technical Field

The present disclosure relates to seals, and in particular, to seals that are adapted to seal roll-up type doors, such as cargo vehicle doors, garage and cargo bay doors, etc.

2. Description of the Related Art

Cargo trucks are sometimes provided with "roll-up" type cargo doors which raise and lower to selectively provide access to the cargo space of the truck. Such roll-up doors typically include a series of horizontal door panels hingedly connected to one another such that each panel is pivotable with the respect to the next adjacent panel about a horizontal hinge axis. As the roll-up door is raised, the panels progressively shift from a vertical orientation to a substantially horizontal orientation as the panels move inwardly away from the top of the door frame. To facilitate this function, rollers attached to the roll-up door typically ride within tracks disposed at each side of the door frame, with the tracks running vertically along the sides of the door frame and curving away from the top of the door frame to extend inwardly.

Seals may be provided along either side of roll-up door assemblies to inhibit ingress of water, smoke, particulates, or the like into the cargo space when the roll-up door is closed. In some cases, such seals are affixed to the door frame via fasteners, which may be coupled directly to the body of the seal or to a frame structure built around the seal. These seal arrangements hold a flexible portion of the seal against the outer surface of the roll-up door when the door is in a closed position.

Other roll-up door seals utilize specially designed door frames which accommodate custom-made, correspondingly shaped seal structures. These special seals may fit within the specially designed door frame structure to retain the seal at a desired position and orientation, but are not compatible with standard roll-up door frames or with other custom door frames.

Still other seals utilize multi-density cross-sectional profiles, including a relatively high density seal portion that can be press fit into a seal receiving area of a frame, and a lower density seal portion that is more flexible and bear against the roll-up door when the door is in the closed position. Such seals are typically made from polyvinyl chloride (PVC) with differing durometer values among the different seal portions.

While known roll-up door seals may be effective, it is desirable to minimize the cost and complexity of a roll-up door seal design, while also providing a reliable, long-lasting and fluid-tight seal between the roll-up door and the surrounding environment.

SUMMARY

The present disclosure provides a roll-up door seal that may be monolithically formed from a single material of uniform density. The seal is sized and adapted to assemble to a standard roll-up door frame without a separate or dedicated frame structure. The seal provides redundant sealing surfaces, positioned to cooperate with both the door and door frame, which ensure an effective and durable fluid tight seal between the cargo space enclosed by the roll-up door and the ambient environment. The seal may be produced by extrusion from a flexible, weather resistant material such as EPDM, thereby providing a low cost solution for sealing roll-up doors having industry standard door frame constructions. The seal is firmly engageable with the door frame, such that the seal may be installed with little or no use of secondary fixation.

In one form thereof, the present disclosure provides a seal for use in conjunction with a roll-up door and door frame, the seal including a coupling body having a seating surface and an exposed surface opposite the seating surface, a pair of opposed side surfaces extending between the seating surface and the exposed surface, a longitudinal body axis extending from the seating surface to the exposed surface between the pair of opposed side surfaces; and a plurality of securement ribs extending from each of the side surfaces, the plurality of securement ribs having a longitudinal extent defining a longitudinal rib axis, the longitudinal rib axis defining an acute angle with the longitudinal body axis, the acute angle opening toward the exposed surface. The seal further includes a main sealing lobe extending from the exposed surface of the coupling body, the main sealing lobe having an arcuate cross-sectional profile defining a concave inner surface and an opposing convex outer surface such that the main sealing lobe is adapted to bias against an adjacent door surface; and a secondary sealing lobe extending from an outwardly facing surface of the main sealing lobe, such that the secondary sealing lobe is positioned to bias against a frame surface opposing the adjacent door surface.

In another form thereof, the present disclosure provides a seal arrangement including: a seal including a coupling body defining a longitudinal body axis and having a plurality of securement ribs extending from the coupling body, the plurality of securement ribs having a longitudinal extent defining a longitudinal rib axis, the longitudinal rib axis defining an acute angle with the longitudinal body axis; a main sealing lobe extending from the coupling body, the main sealing lobe having an arcuate cross-sectional profile defining a concave inner surface and an opposing convex outer surface; and a secondary sealing lobe extending from the convex outer surface of the main sealing lobe. The seal arrangement also includes a door frame having a seal receiving space defining a seal receiving space width, the coupling body of the seal defining a coupling body width which cooperates with the plurality of securement ribs to define an interference fit with the seal receiving space width, such that the seal is securely receivable in the door frame with the main sealing lobe and the secondary sealing lobe protruding outwardly from the seal receiving space; a roller track fixed to the door frame; and a roll-up door including rollers received in the roller track and operable to facilitate movement of the roll-up door between an open position and a closed position, the roll-up door having an outer surface. The main sealing lobe is in contact with the outer surface of the roll-up door when the roll-up door is in the closed position, such that the main sealing lobe is resiliently deformed to bias against the outer surface. The secondary sealing lobe is resiliently deformed to biasing against a surface of the door frame opposite the outer surface of the roll-up door when the main sealing lobe is resiliently deformed.

In yet another form thereof, the present disclosure provides a method of installing a seal into a door frame of a roll-up door, the method including: advancing a body of the seal along a lateral direction, toward a sidewall of a roll-up door frame disposed along a lateral edge of the roll-up door; and pressing the body of the seal along the lateral direction into a seal receiving space formed in the roll-up door frame, such that the body of the seal is captured in the seal receiving space formed in the roll-up door frame. A first sealing lobe protrudes outwardly from the seal receiving space after the step of pressing the body of the seal, and a second sealing lobe protrudes outwardly from an outer surface of the first sealing lobe. The first sealing lobe is curved toward an outer surface of the roll-up door such that the first sealing lobe resiliently deforms to bias against the outer surface of the roll-up door when the roll-up door is placed in a closed position. The second sealing lobe extends toward a flange formed in the roll-up door frame opposite the outer surface of the roll-up door, such that the second sealing lobe resiliently deforms to bias against the flange when the roll-up door is placed in the closed position.

BRIEF DESCRIPTION OF THE DRAWINGS

The above-mentioned and other features and advantages of this disclosure, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates an exemplary embodiment of the invention, and such exemplification is not to be construed as limiting the scope of the invention in any manner.

DETAILED DESCRIPTION

Figure 1:
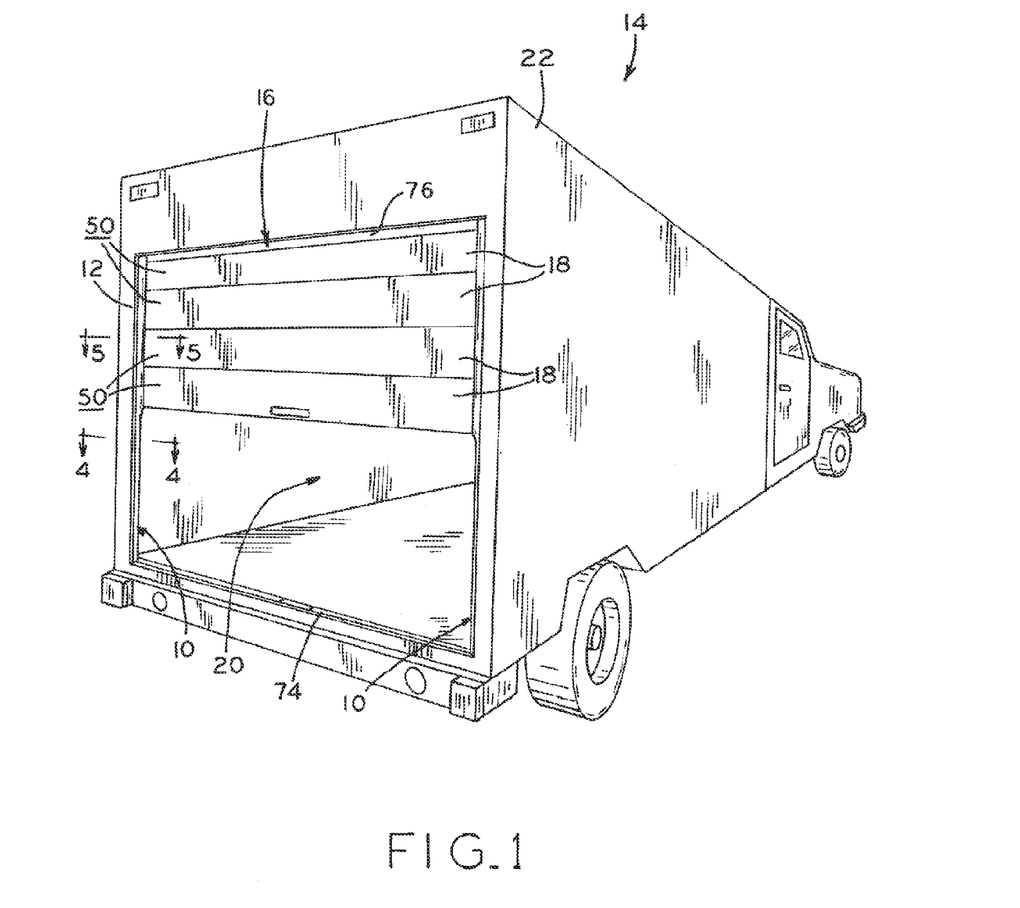
FIG. 1 is a rear perspective view of a cargo truck including a roll-up door fitted with seals made in accordance with the present disclosure.

Turning now to FIG. 1, seals 10 are shown installed at either side of roll-up door frame 12, which is positioned at the rear of cargo box 22 mounted to truck 14. Seals 10 may be identical structures, but are arranged as mirror images of one another so as to have main sealing lobes 40 extending inwardly toward cargo space 20, as described in further detail below. Roll-up door 16 includes a plurality of door panels 18 hingedly connected to one another such that each door panel 18 is pivotable about a horizontal axis. In the illustrated embodiment of FIG. 1, roll-up door 16 is shown in a partially closed configuration, with seals 10 partially deformed into a sealing configuration in the area where roll-up door 16 is closed.

When door 16 is open, cargo space 20 is accessible through the aperture defined by door frame 12, and door panels 18 are disposed within cargo box 22 such that door panels 18 are all substantially parallel to the roof of cargo box 22. In the closed configuration, door panels 18 of roll-up door 16 are vertically oriented (as shown in FIG. 1 with respect to some of the panels 18), such that roll-up door 16 blocks access to cargo space 20 from outside cargo box 22. As described in detail below, seals 10 bear against outer surfaces 50 of door panels 18 to provide a fluid tight seal between cargo space 20 of cargo box 22 and the surrounding environment.

Figure 2:
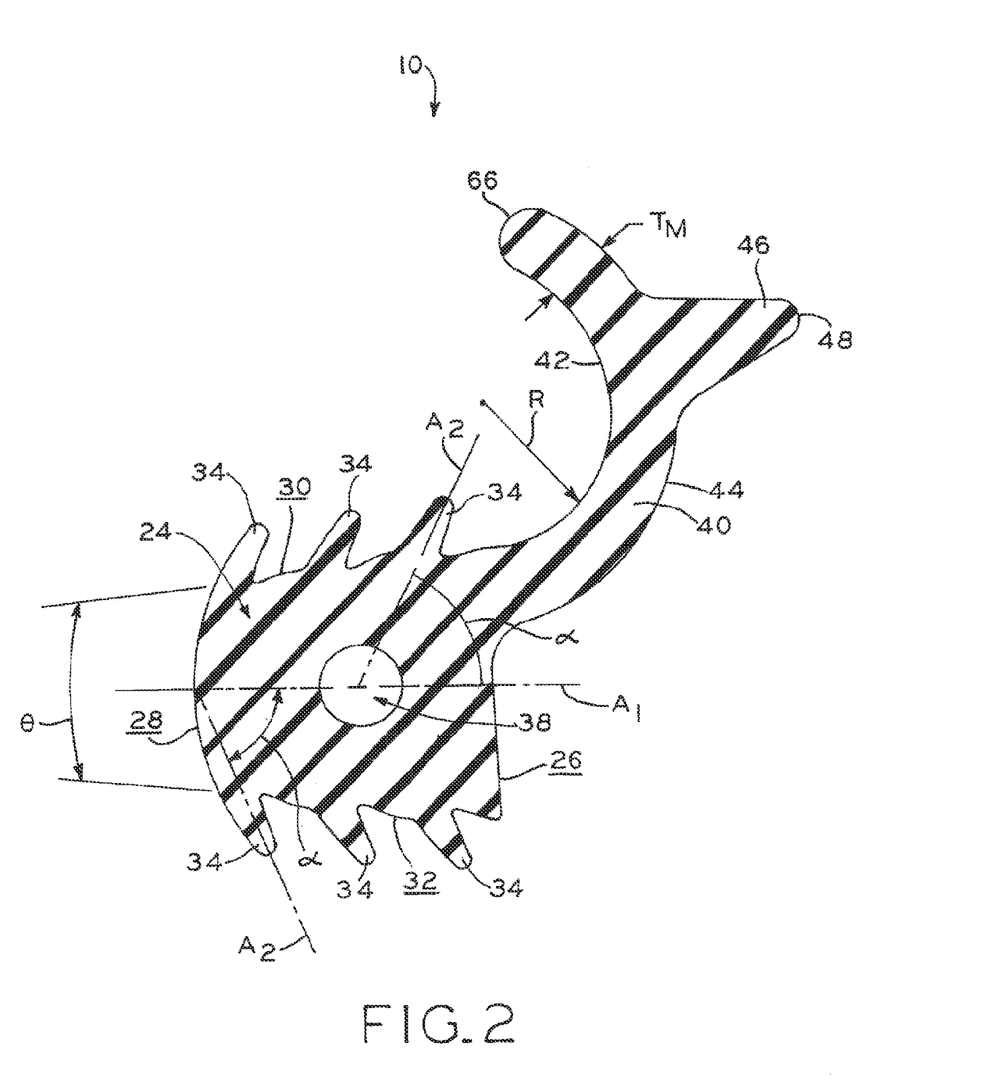
FIG. 2 is a cross-sectional view of an exemplary seal made in accordance with the present disclosure.
Figure 3:
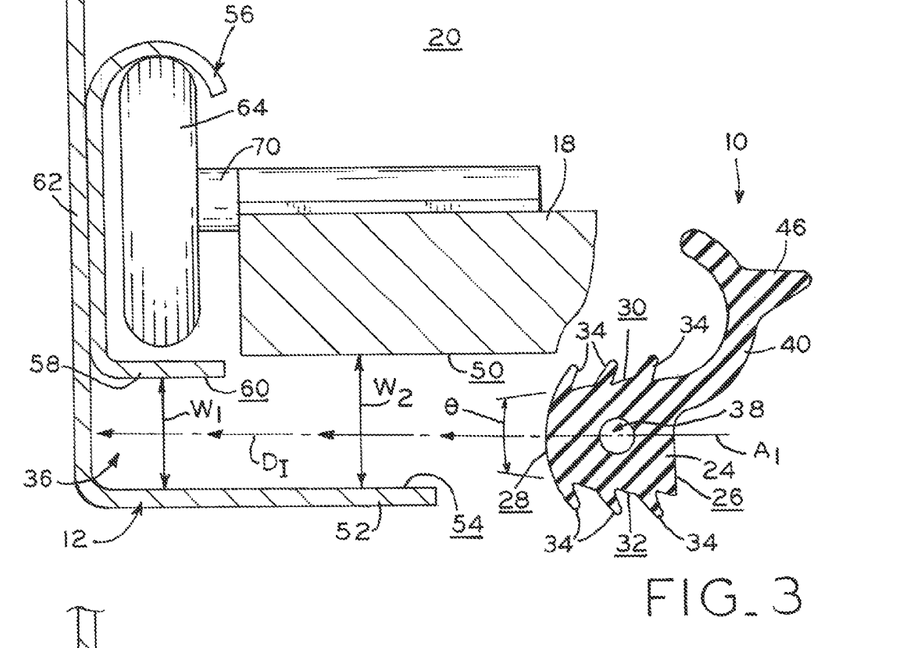
FIG. 3 is a plan, cross-sectional view, taken along line 5-5 of FIG. 1, illustrating assembly of the seal to a roll-up door frame.

FIG. 2 illustrates a cross-sectional profile of seal 10 in an uncompressed state, after manufacture and prior to installation within door frame 12 (FIG. 3). Seal 10 includes coupling body 24 defining longitudinal axis $A_1$, which may also be an axis of symmetry for coupling body 24. Axis $A_1$ extends along insertion direction $D_I$, shown in FIG. 3, which is the direction of assembly of seal 10 to door frame 12, as described in further detail below. Coupling body 24 tapers along axis $A_1$ from exposed surface 26 toward seating surface 28, such that side surfaces 30, 32 define angle $\theta$ therebetween. As illustrated, angle $\theta$ is measured without taking into account securement ribs 34, which extending outwardly from each of side surfaces 30, 32. In an exemplary embodiment, angle $\theta$ may be as little as zero, 5 or 10 degrees or may be as large as 20, 25 or 30 degrees, or may be any value within any range defined by any of the foregoing values. In one particular exemplary embodiment, angle $\theta$ is about 4 degrees.

Figure 4:
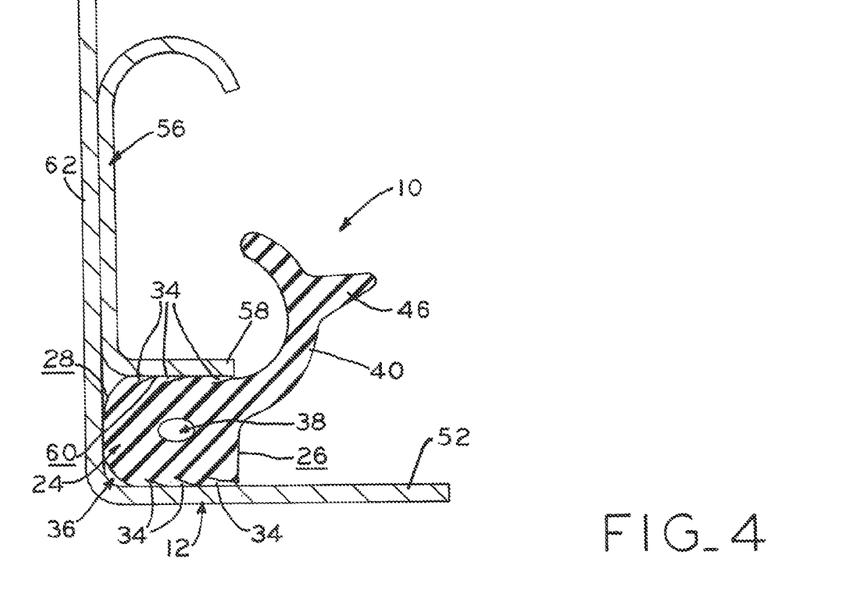
FIG. 4 is a plan, cross-sectional view, taken along line 4-4 of FIG. 1, illustrating the seal of FIG. 3 after assembly to the roll-up door frame.
Figure 5:
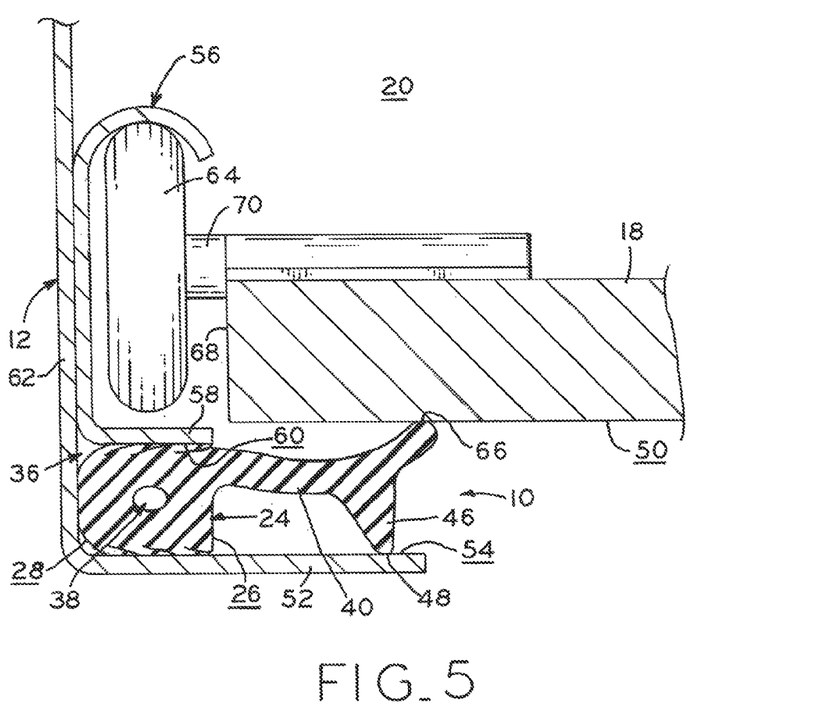
FIG. 5 is a plan, cross-sectional view, taken along line 5-5 of FIG. 1, illustrating the seal of FIG. 2 when the roll-up door is in the closed position.

Seating surface 28 has a generally rounded profile, as shown in FIG. 2, to further facilitate initial insertion of coupling body 24 into seal receiving space 36. Exposed surface 26, disposed opposite seating surface 28, is substantially flat (i.e., planar) to facilitate flush mounting with the adjacent edge of a flange 58 of roller track 56, as shown in FIGS. 4 and 5 and described in further detail below.

Securement ribs 34 are elongate structures as viewed in the cross section of FIG. 2, and therefore each define a longitudinal axis $A_2$. Each axis $A_2$ forms an acute angle $\alpha$ with respect to axis $A_1$ of coupling body 24, with each of securement ribs 34 configured such that angle $\alpha$ opens away from insertion direction $D_I$ and toward exposed surface 26 of coupling body 24. As described in further detail below, this configuration allows securement ribs 34 to easily deform when coupling body 24 is seated within seal receiving space 36 (FIGS. 3 and 4), while also resisting removal of coupling body from seal receiving space 36. In the interest of drawing clarity, the longitudinal axis $A_2$ of securement ribs 34 is shown for only one of securement ribs 34 on each of side surfaces 30, 32, it being understood that the other securement ribs 34 also define respective axes $A_2$ forming angle $\alpha$ with respect to the longitudinal axis $A_1$ of coupling body 24. In an exemplary embodiment, angle $\alpha$ may be as little as 45, 55 or 65 degrees or may be as large as 75, 85 or 90 degrees, or may be any value within any range defined by any of the foregoing values. In one particular exemplary embodiment, angle $\alpha$ is about 67 degrees.

In the illustrated embodiment of FIG. 2, three securement ribs 34 are provided on each of side surfaces 30, 32. However, it is contemplated that a larger or smaller number of ribs 34 may be provided to decrease or increase the securement of coupling body 24 within seal receiving space 36, respectively, as required or desired for a particular application. In an exemplary embodiment, securement ribs 34 are sized and spaced from one another such that each of securement ribs can deform or "fold" down, in the direction of exposed surface 26 of coupling body 24) to abut the adjacent side surface 30 or 32 upon installation of seal 10. Aperture 38 may also be formed within coupling body 24 to facilitate deformation thereof during installation of seal 10, as also described below.

Extending away from exposed surface 26 is main sealing lobe 40, as best seen in FIG. 2. As illustrated, main sealing lobe 40 has a generally arcuate profile in cross-section, with an inner surface 42 forming an arcuate continuation of side surface 30. When seal 10 is assembled to door frame 12, side surface 30 is the inwardly facing surface of coupling body 24, i.e., the surface facing toward the enclosed cargo space 20 of cargo box 22. Thus, the illustrated position and arrangement of main sealing lobe 40 near inward side surface 30 biases sealing lobe 40 toward door panels 18 when roll-up door 16 is positioned closed, as shown in FIG. 5 and further described below.

Opposite inwardly facing surface 42 of main sealing lobe 40 is outwardly facing surface 44, which has secondary sealing lobe 46 protruding therefrom. In the illustrative embodiment of FIG. 2, main sealing lobe 40 has a substantially constant thickness $T_M$ throughout its arcuate extent, while secondary sealing lobe 46 has a generally triangular profile with a steadily decreasing thickness from the wide base of sealing lobe 46 (at its intersection with main sealing lobe 40) to the narrower tip 48 of secondary sealing lobe 46 (i.e., the point on sealing lobe 46 furthest from outer surface 44 of main sealing lobe 40).

Assembly of seal 10 to door frame 12 is illustrated in FIG. 3. Seal 10 is received within seal receiving space 36 such that main sealing lobe 40 is positioned to bear against door panel 18 while secondary sealing lobe 46 bears against an inner surface 54 of flange 52 of door frame 12. Seal receiving space 36 is a generally rectangular void (as viewed in the plan cross-sectional view of FIG. 3), bounded on three sides by structures of door frame 12 and open on the fourth side. Opposite the open end of seal receiving space 36, sidewall 62 of door frame 12 forms the "bottom" or base of seal receiving space 36, against which seating surface 28 bears upon assembly of seal 10 to door frame 12 (FIG. 4). Flange 58 of roller track 56 forms an inward wall of seal receiving space 36, while flange 52 of door frame 12 forming the opposing outward wall.

In certain exemplary embodiments, roller track 56 is fixedly attached to door frame 12, such as by welding, riveting or other fixed attachment, such that a plurality of rollers 64 connected to door panels 18 via axles 70 ride within roller track 56 as door 16 is raised and lowered (FIG. 1). Door frame 12 may be provided in a standard size and arrangement with roller track 56 affixed thereto in a standard configuration to accommodate mass produced roll-up doors 16 and rollers 64.

Seal receiving space 36 defines width $W_1$ between outwardly facing surface 60 of track flange 58 and the opposing inwardly facing surface 54 of frame flange 52. In an exemplary embodiment in the context of roll-up cargo truck doors (such as door 16 shown in FIG. 1), width $W_1$ may be between 0.5 inches and 1 inch. For other applications in other contexts, the overall profile shown and described herein may be scaled up or down to provide seals usable for other door frame sizes.

In one exemplary embodiment, door frame 12 defines width $W_1$ of 0.88 inches, and the corresponding width of body 24 of seal 10 is about 0.74 inches wide at seating surface 28 and 0.82 inches wide at exposed surface 26. In this exemplary embodiment, securement ribs are each between 0.06 inches and 0.1 inches wide, and are about 0.25 inches long as measured along axis $A_2$. In this exemplary embodiment, the overall length of seal 10 (corresponding to the height of the sides of door frame 12 and shown in FIG. 1) may be about 110 inches.

As noted below, seal 10 may be provided in one or more standard sizes to accommodate various industry standard geometries for door frame 12. More particularly, body 24 of seal 10 may be sized and configured to be received within a standard size seal receiving space 36, while main sealing lobe 40 and secondary sealing lobe 46 are sized and configured to occupy the space between frame flange 52 and door panels 18. As further described below, lobes 40, 46 may be specifically arranged to fill in a gap having width $W_2$ between outer surface 50 of door panel 18 and inwardly facing surface 54 of frame flange 52, while providing a secure sealing arrangement therewithin.

Assembly of seal 10 to door frame 12 along insertion direction $D_I$ (FIG. 3) can be accomplished quickly and efficiently. In an exemplary assembly method, body 24 of seal 10 is advanced along insertion direction $D_I$ such that seating surface 28 of body 24 forms the leading edge of seal 10 advancing into seal receiving space 36. The rounded outer profile of seating surface 28 facilitates initial insertion between flange 58 of roller track 56 and flange 52 of door frame 12. As coupling body 24 is further advanced along insertion direction $D_I$, the first pair of securement ribs 34 (i.e., those securement ribs 34 which are closest to seating surface 28) deflect toward side surfaces 30, 32, respectively. This initial deflection is facilitated by the tapered profile of side surfaces 30, 32, which cooperate to define angle θ (FIG. 3) therebetween.

Further advancement of coupling body 24 along direction $D_I$ into seal receiving space 36 deflects the remaining securement ribs 34 as respective pairs of ribs 34 come into contact with frame flange 52 and track flange 58. As the width between side surfaces 30, 32 increases along the tapered outer profile of body 24, body 24 is more and more tightly received within seal receiving space 36. To accommodate the eventual interference fit between such wider body portions and seal receiving space 36, aperture 38 may compress from a circular to ellipsoid configuration as shown in FIG. 4.

In one exemplary embodiment, width $W_1$ is equal to about 0.88 inches. As noted above, the corresponding width of body 24 for this exemplary embodiment is about 0.74 inches at seating surface 28, excluding the adjacent securement ribs 34, which facilitates initial insertion of body 24 into seal receiving space 36. However, the final width of body 24 adjacent exposed surface 26 is about 0.82 inches, which cooperates with the about 0.1 inch thick securement ribs 34 to create an interference fit. Thus, the material of body 24 must be deformed to fully seat body 24 within seal receiving space 36. When body 24 is fully received within seal receiving space 36, seating surface 28 contacts sidewall 62 of door frame 12, all of securement ribs 34 are deflected toward their respective side surfaces 30, 32, coupling body 24 is slightly compressed such that aperture 38 is slightly deformed, and exposed surface 26 is substantially flush with the edge of track flange 58. This fully assembled configuration is illustrated in FIG. 4.

Although body 24 may be easily received within seal receiving space 36, a much greater force is required to remove body 24 therefrom. This insertion/removal force differential results from the orientation of securement ribs 34 with respect to longitudinal axis $A_1$ of coupling body 24, and therefore with respect to insertion direction $D_I$ (FIG. 3).

More particularly, as noted above, securement ribs 34 each define acute angle α with respect to longitudinal axis $A_1$, such that angle α opens away from seating surface 28 and toward exposed surface 26. Upon insertion of coupling body 24 into seal receiving space 36, this angular arrangement allows securement ribs 34 to deflect toward exposed surface 26 easily and with minimal frictional resistance. However, if coupling body 24 is pulled along a removal direction opposite insertion direction $D_I$, securement ribs 34 bear against inwardly facing surface 54 of frame flange 52 and outwardly facing surface 60 of track flange 58, respectively. Along this removal direction, angle α defined by securement ribs 34 serves to urge securement ribs 34 to expand away from side surfaces 30, 32, respectively, rather than urging ribs 34 toward contact therewith. This expansion effectively increases the overall width of coupling body 24, thereby increasing the level of friction between coupling body 24 and surfaces 54, 60 of flanges 52, 58, respectively.

Figure 10:
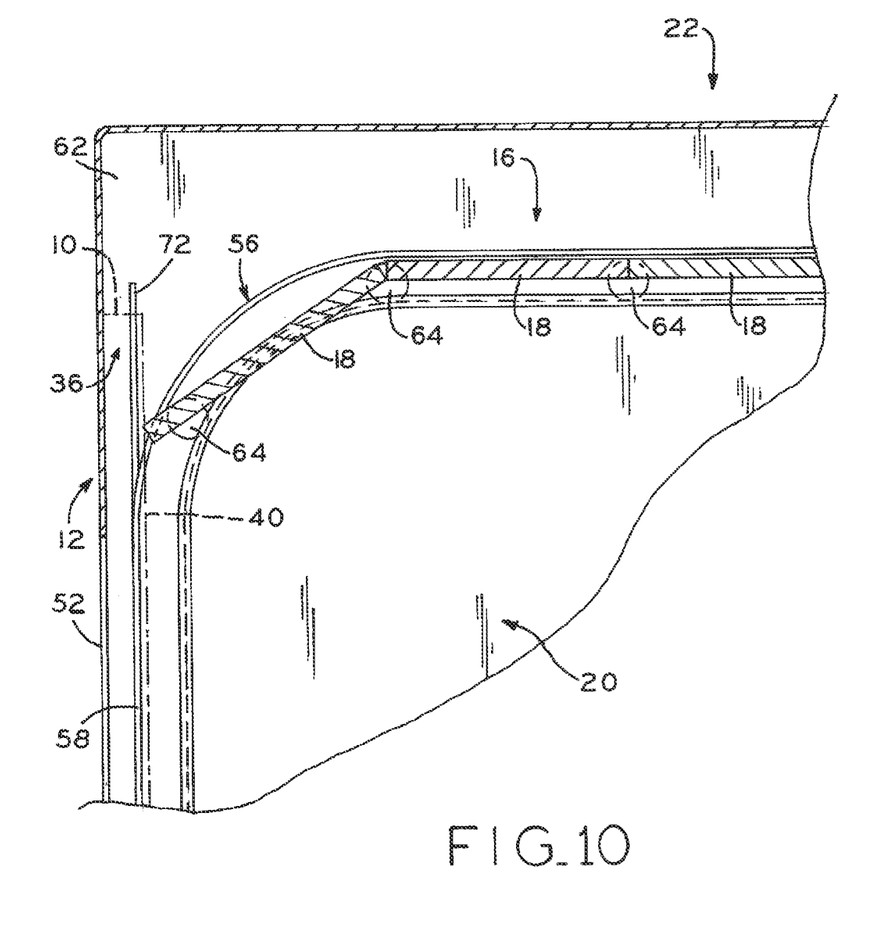
FIG. 10 is an elevation view of a portion of a roll-up door frame including a seal made in accordance with the present disclosure.

Thus, the force required to remove coupling body 24 from seal receiving space 36 is substantially higher than the force required to insert coupling body 24 into seal receiving space 36 along insertion direction $D_I$. This force differential allows seal 10 to be effectively used in conjunction with door frame 12 with little or no use of adhesives, fasteners, or other secondary fixation. Using only the material of coupling body 24, firm securement of seal 10 to door frame 12 can be effected by pushing the coupling body 24 into the seal receiving space 36. In the exemplary embodiment shown in FIG. 10, for example, only the top portion of seal 10 (i.e., the portion near the curved portion of roller track 56) is secured within door frame 12 by secondary fixation, such as adhesive. The remainder of seal 10 extending downwardly below such curved portion may be secured only by interaction between coupling body 24 and seal receiving space 36.

In one exemplary embodiment, seal 10 is monolithically formed from EPDM (ethylene propylene diene monomer) rubber having durometer 55. In other exemplary embodiments, the durometer of the seal material may be as little as 40, 50 or 60 or may be as large as 65, 75 or 85, or may be any value within any range defined by any of the foregoing values. EPDM rubber is highly resistant to degradation from weather and sun, while also being sufficiently soft and pliable to create an effective seal between cargo space 20 of cargo box 22 and the surrounding ambient environment. Accordingly, this material has proven ideal for use with roll-up doors used in cargo trucks and other demanding outdoor environments.

In the installed configuration of FIG. 4, main sealing lobe 40 and secondary sealing lobe 46 remain in their undeformed state due to the absence of roll-up door 16 at the location of the FIG. 4 cross-section (as shown in FIG. 1). As roll-up door 16 is advanced from the open to closed position, sealing lobes 40, 46 are progressively deformed into a sealing configuration along the extent of seal 10. In an exemplary embodiment shown in FIG. 10, roll-up door frame 12 includes extension 72, which abuts and aligns with outwardly facing surface 50 of roller track 56 to extend seal receiving space 36 upwardly past the point where track flange 58 of roller track 56 begins its inward bend into cargo space 20. This effective lengthening of seal receiving space 36 allows seal 10 to be made longer and to extend substantially above the initial inward bend of roller track 56, such that the first point of contact between the leading edge of door panel 18 and main sealing lobe 40 is substantially spaced away from the end of seal 10. This in turn prevents sealing lobe 40 from "folding over" upon first contact by panel 18 of door 16, and promotes proper deformation of lobe 40 into its sealing configuration as described in further detail below.

After initial deformation of sealing lobe 40, outer surfaces 50 of door panels 18 successively come into contact with tip 66 of main sealing lobe 40 further and further down the length of seal 10. This "zipper" effect progressively forces lobe 40 outwardly (i.e., in a direction away from cargo space 20 of cargo box 22), which in turn advances tip 48 of secondary sealing lobe 46 into contact with inwardly facing surface 54 of frame flange 52 as illustrated in FIG. 5. Lobes 40, 46 are sized and configured to occupy a space between door panel 18 and frame flange 52 that is slightly larger than width $W_2$, such that slight compression and deformation of lobes 40 and 46 occurs. This compression forms a pair of firm, fluid-tight seals between cargo space 20 and the ambient environment around cargo box 22.

Because lobes 40, 46 are forcibly deformed into their sealing configurations shown in FIG. 5, the resiliency of the material of seal 10 serves to bias tips 66, 48 of lobes 40, 46 toward contact with their respective sealing surfaces 50, 54. This spring-like bias force maintains the redundant pair of fluid-tight seals formed by seal 10, even if movement or vibration of door panels 18 and/or door frame 12 occurs (such as while truck 14 is moving). Moreover, the deformation of main sealing lobe 40 serves to "push" secondary sealing lobe 46 into its sealing arrangement, which in turn "pushes back" against main sealing lobe 40. In this way, sealing lobes 40, 46 act as mutually opposed biasing elements urging one another into sealing contact with their mutually opposed sealing surfaces 50, 54 respectively. Such biased contact between lobes 40, 46 and the adjacent sealing surfaces 50, 54 ensures that a lasting, durable fluid-tight seal will form even as the material of seal 10 becomes weathered over time.

The amount of bias force provided by main sealing lobe 40 toward outer surface 50 of door panel 18 can be raised or lowered by changing the size and geometry of lobe 40. For example, thickness $T_M$ (FIG. 2) may be increased to elevate the biasing force, or decreased to reduce the biasing force. In an exemplary embodiment designed for a seal receiving space 36 having width $W_1$ of 0.88 inches and a door frame arrangement defining width $W_2$ of 0.688 inches (with a tolerance of +/−0.063 inches), thickness $T_M$ is 0.19 inches.

Another variable affecting the biasing force is the undeformed radius of curvature R defined by lobe 40 (shown in FIG. 2 as radius R at inwardly facing surface 42). If radius R is increased, the biasing force will decrease because the amount of material deformation will be reduced. Conversely, a decrease in radius R will cause an increase in material deformation and a concomitant increase in biasing force. As biasing force increases, sealing deformation and the ability of lobe 40 to span width $W_2$ increases. In the exemplary embodiment discussed above, radius R is about 0.5 inches. In the exemplary embodiments shown in FIGS. 6-9 and described in detail below, radii $R_{100}$, $R_{200}$ are 2.3 about inches. For larger or smaller seal arrangements, such as those having larger or smaller width $W_2$, the overall size of lobe 40 will increase accordingly. However, the overall thickness of lobe 40 may remain substantially constant.

Similarly, secondary sealing lobe 46 may be changed in size and thickness to provide greater or lesser biasing force against inwardly facing surface 54 of frame flange 52. In the exemplary embodiment referenced above for a width $W_1$ of 0.88 inches for seal receiving space 36 and width $W_2$ of 0.688 to 0.748 inches, lobe 46 may extend an appropriate distance away from outwardly facing surface 44 of lobe 40, measured as the shortest distance from the extrapolated outer surface 44 to the end of tip 48 of lobe 46. In the case of seal 10, this distance may be about 0.5 inches. Lobe 46 may also define an overall width at the base thereof equal to about 0.38 inches. The overall length and/or width dimensions can be increased to increase the biasing force provided by lobe 46, or may be decreased to decrease such biasing force. Although lobe 46 is shown as being made of solid material in FIGS. 2-5, an aperture may be provided therein to reduce the biasing force provided by lobe 46.

In an exemplary embodiment, lobes 40 and 46 of seal 10 are designed to provide a high enough level of biasing force against their respective sealing surfaces 50, 54 to create a reliably fluid-tight seal, while being low enough to prevent undue friction against door panels 18. In this embodiment, the appropriate level of biasing force can be calculated within a range of forces that both a) reliably creates a fluid-tight seal and b) results in a friction force sufficiently low to allow the user of roll-up door 16 to manually open and close roll-up door 16.

As illustrated in FIG. 5, when door 16 is in the closed position tip 66 extends laterally toward the middle of door panel 18 by a substantial distance, i.e., the distance between exposed surface 26 and tip 66 of lobe 40. In the exemplary embodiment described above adapted for use with a seal receiving space 36 having width $W_1$ of 0.88 inches, this lateral distance may be about 1.5 inches or more. This allows seal 10 to reliably bias against outer surface 50 of door panel 18, even if lateral edge 68 (FIG. 5) of door panels 18 of door 16 are variably spaced from sidewall 62 of door frame 12. For example, in some standard roll-up door designs, axle 70 of rollers 64 may be longer or shorter than in other standard designs, thereby changing the lateral position of edge 68 of door panels 18. In other cases, rollers 64 (and therefore door panels 18) are allowed to shift laterally within roller track 56 as the roll-up door 16 opens or closes. Such lateral shifting may be significant, such as up to 0.5 inches in either lateral direction. Seal 10, with its long sealing lobe 40, is usable on all such standard door frame designs despite variations in the exact size and configuration, and potential lateral shift of the corresponding roll-up door.

As described above, seal 10 may be installed quickly and efficiently without tools, and with little or no use of adhesives or other secondary fixation structures. Coupling body 24 is simply advanced laterally, i.e., along direction $D_I$ (FIG. 3) such that the installer standing near cargo box 22 passes seal 10 toward sidewall 62 of frame 12. This lateral advancement is complete when coupling body 24 is fully received within seal receiving space 36. When so installed, coupling body 24 is captured within seal receiving space 36, as discussed in detail above, and sealing lobes 40, 46 protruded outwardly from seal receiving space 36. In one exemplary embodiment, such installation may be effected without fasteners or adhesives. In another exemplary embodiment, a minimal amount of such auxiliary coupling aids is used, such as at the top or seal 12 as described above. Seal 10 is installed along its length such that the sides of door frame 12 are completely sealed.

To uninstall seal 10, seal 10 can be simply grasped (e.g., by sealing lobe 40) and pulled free from seal receiving space 36 and door frame 12. Although seal 10 requires an elevated amount of force to remove from seal receiving space 36, such force can be marshaled by a maintenance person when needed to uninstall and replace seal 10. Such uninstallation is simplified by the minimal use (or lack of) fasteners and adhesives used in the initial installation. Thus, seal 10 may be readily replaced whenever such replacement becomes necessary. Moreover, because seal 10 can be made from a single, monolithic extruded material as detailed above, replacement seals 10 can be produced in large quantities for a minimal cost.

Figure 6:
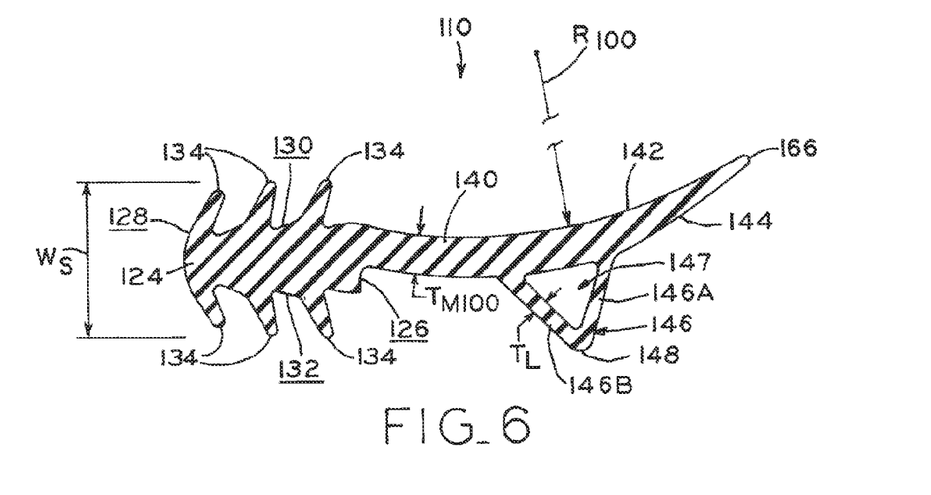
FIG. 6 is a cross-sectional view of another exemplary seal taken along line 4-4 of FIG. 1, with only the seal shown, and made in accordance with the present disclosure.

Turning now to FIG. 6, a cross-sectional profile of alternative seal 110 is shown. Seal 110 is similar to seal 10 described above, with reference numerals of seal 110 analogous to corresponding reference numerals used in seal 10, except with 100 added thereto. Structures of seal 110 correspond to similar structures denoted by corresponding reference numerals of seal 10 except as otherwise noted, and seal 110 is installed to door frame 12 in a similar fashion as described above (and as shown in FIG. 7).

Figure 7:
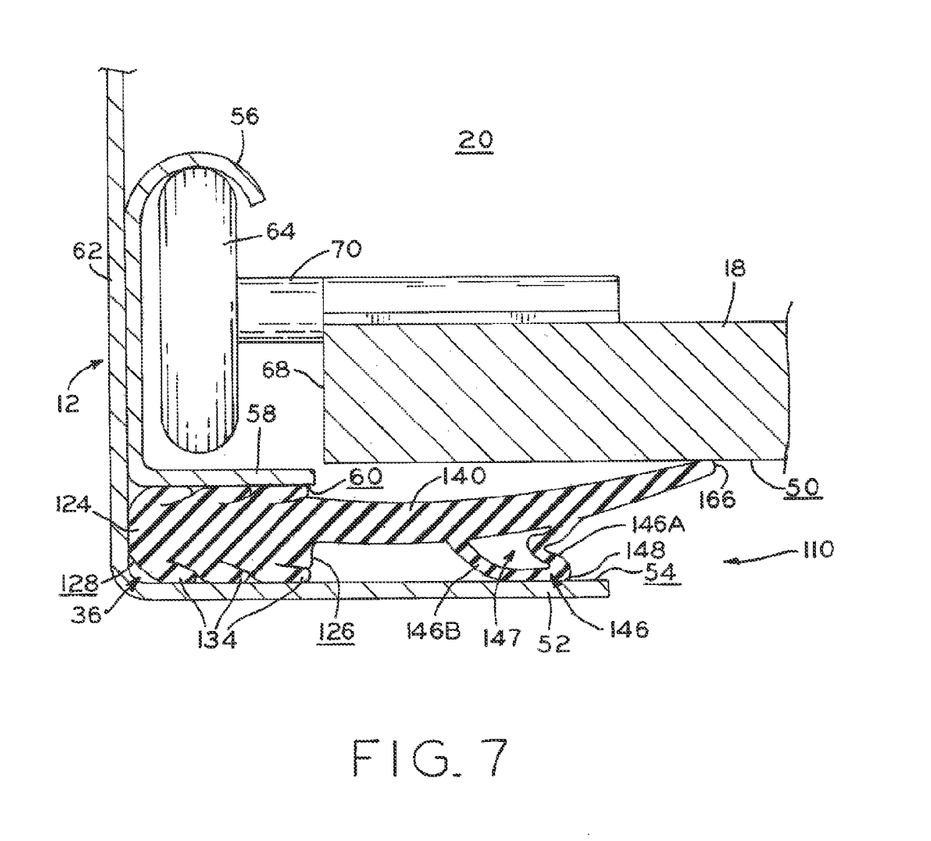
FIG. 7 is a plan, cross-sectional view of the seal shown in FIG. 6, taken along line 5-5 of FIG. 1, illustrating the seal configuration when the roll-up door is in the closed position.

However, coupling body 124, main sealing lobe 140 and secondary sealing lobe 146 of seal 110 have unique geometries which provide seal 110 with unique sealing characteristics. Coupling body 124 has a narrower overall narrower profile but with longer securement ribs 134 extending therefrom. This arrangement allows for more pronounced deformation of securement ribs 134 upon assembly into seal receiving space 36 (as shown in FIG. 7), and obviates the need for aperture 38 used in seal 10 (FIG. 2). Also, as most clearly illustrated by a comparison of FIGS. 5 and 7, the overall length of seal 110 is also substantially longer than that of seal 10. In an exemplary embodiment, the largest cross-sectional dimension of seal 110 in the undeformed state of FIG. 6 is about 2.73 inches. The overall undeformed width $W_S$ of coupling body 124 is about 0.71 inches, such that seal 110 is suitable for use in door frame 12 having a width $W_1$ of seal receiving space 36 (FIG. 3) equal to 0.5 inches.

Main sealing lobe 140 has a substantially reduced curvature in its at-rest, undeformed state as shown in FIG. 6. Accordingly, radius $R_{100}$ defined by the concave cross-sectional profile of inner surface 142 of lobe 140 is substantially larger than radius R of lobe 40 of seal 10. As noted above, such a reduction in the curvature of lobe 140 as compared to lobe 40 produces less biasing force against outer surface 50 of door panels 18 when seal 110 is in its sealing, deformed state (FIG. 2). Concomitantly, less friction is produced at the area of contact between tip 166 and outer surfaces 50 of respective door panels 18 of roll-up door 16. For certain exemplary embodiments, such as roll-up doors commonly found on the rear enclosures of cargo trucks, the large-radius arrangement shown in FIG. 6 has been found to provide a firm, liquid-tight seal while preventing undue friction.

Main sealing lobe 140 also lacks the constant thickness $T_M$ found in lobe 40 of seal 10 (FIG. 2). Instead, lobe 140 defines a relatively constant thickness $T_{M100}$ (FIG. 6) between exposed surface 126 and secondary sealing lobe 146, then a tapering thickness between secondary sealing lobe 146 and tip 166 (where tip 166 is at the end of the longitudinal extent of lobe 140, opposite exposed surface 126 as shown in FIG. 6). Stated another way, the shortest distance between concave inner surface 142 and the opposing, convex outer surface 144 of sealing lobe 140 steadily decreases as one traverses the longitudinal extent of main sealing lobe 140 from secondary sealing lobe 146 to tip 166.

Secondary sealing lobe 146 retains the generally triangular profile found in secondary sealing lobe 46 of seal 10, but is more nearly equilateral in overall shape and has aperture 147 formed therein. As shown in FIG. 7, when seal 10 enters its sealing configuration with respect to door panel 18, secondary sealing lobe 146 substantially deforms to create a liquid-tight seal with inwardly facing surface 54 of flange 52 of door frame 12. More particularly, a first lobe wall 146A, extending from toward tip 166 of main sealing lobe 140, resiliently deforms into a "buckled" configuration, as shown in FIG. 7, when tip 148 of lobe 146 (i.e., the point on sealing lobe 146 furthest from outer surface 144 of main sealing lobe 140) is urged into contact with inwardly facing surface 54. This buckling causes first lobe wall 146A to protrude into aperture 147 as illustrated, so that tip 148 of secondary sealing lobe 146 deflects in an opposite direction to that of tip 166 of main sealing lobe 140.

The resiliency of the material of first lobe wall 146A, i.e., the tendency of first lobe wall 146A to return to its undeformed configuration, provides a constant biasing force urging main sealing lobe 140 toward outer surface of door panel 18. This force biases lobe tip 166 into sealing engagement with surface 50, in similar fashion as described above with respect to seal 10. Meanwhile second lobe wall 146B, which is located opposite first lobe wall 146A and extends toward coupling body 124 as shown, is urged into sealing contact with inner surface 54 of flange 52 by the resilient deformation of main sealing lobe 140, such that lobes 140, 146 bias each other into sealing engagement. In addition, the extended sealing contact of second lobe wall 146B across a substantial portion of second lobe wall 146B, such as about half of its cross sectional extent as illustrated, providing a reliably liquid-tight seal at surface 54. In an exemplary embodiment, the above-described sealing action can be achieved with a lobe wall thickness TL (FIG. 6) of about 0.07 inches.

Figure 8:
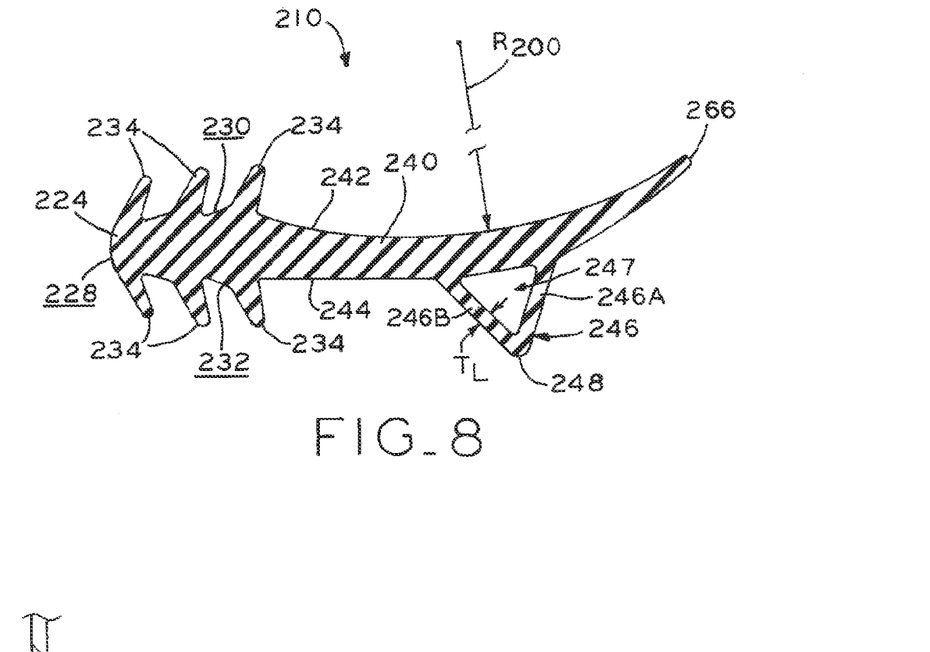
FIG. 8 is a cross-sectional view of yet another exemplary seal taken along line 4-4 of FIG. 1, with only the seal showing, and made in accordance with the present disclosure.
Figure 9:
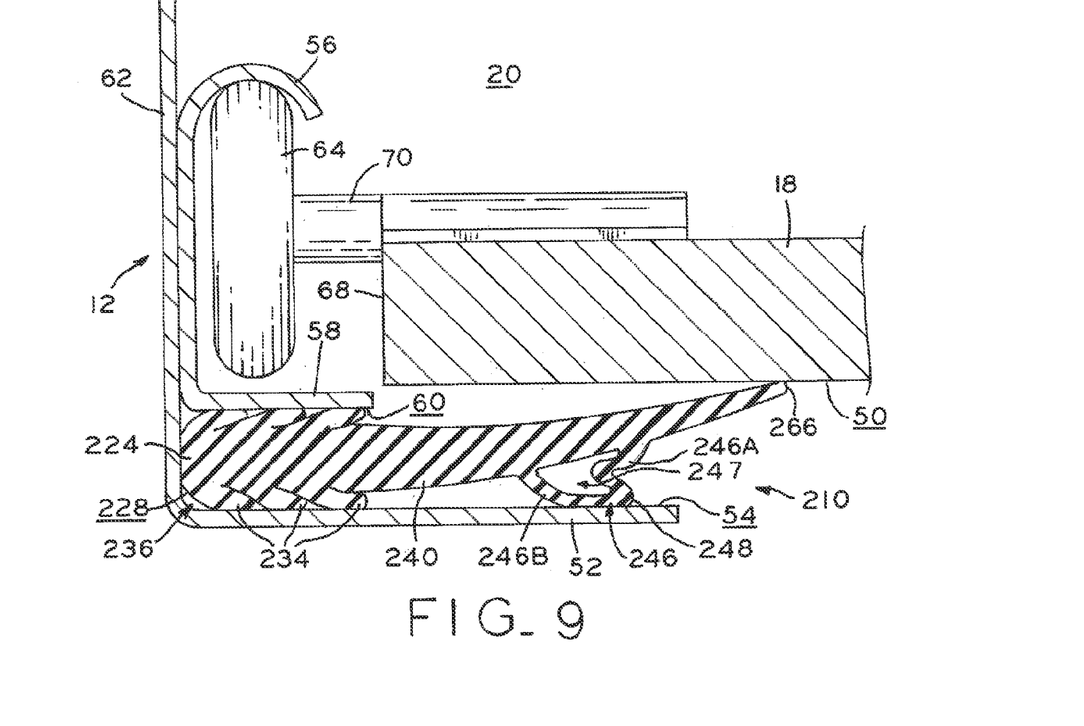
FIG. 9 is a plan, cross-sectional view of the seal shown in FIG. 8, taken along line 5-5 of FIG. 1, illustrating the seal configuration when the roll-up door is in the closed position.

Turning to FIGS. 8 and 9, a cross-sectional profile of another alternative seal 210 is shown. Seal 210 is similar to seals 10, 110 described above, with reference numerals of seal 210 analogous to corresponding reference numerals used in seal 10, 110, except with 100 or 200 added thereto respectively. Structures of seal 210 correspond to similar structures denoted by corresponding reference numerals of seals 10, 110 except as otherwise noted, and seal 210 is installed to door frame 12 in a similar fashion as described above (and as shown in FIG. 9).

In an exemplary embodiment, seal 210 is identical to seal 110 except at the junction between main sealing lobe 240 and coupling body 224. More particularly, seal 210 lacks the constant-thickness section found main sealing lobe 140 (i.e., that portion of sealing lobe 140 having thickness $T_{M100}$) and instead has a steadily increasing thickness toward coupling body 224. As above, this thickness is measured as the shortest distance from concave inner surface 242 to convex outer surface 244, taken along any point along the longitudinal extent of the illustrated cross-section of sealing lobe 240. As illustrated, this arrangement eliminates any analog to exposed surfaces 26, 126 in seal 210, with convex outer surface 244 of main sealing lobe 240 instead blending smoothly with side surfaces 232 of coupling body 224. This profile enhances the strength of the connection between lobe 240 and coupling body 224, and provides some additional biasing force to tip 266 of lobe 240.

Referring back to FIG. 1, bottom seal 74 and/or top seal 76 may also be provided as needed to complete liquid-tight seal around roll-up door 16. Bottom and/or top seals 74, 76 may be used in a known configuration, except that the ends of bottom seal 74 may be trimmed as necessary to accommodate seals 10, 110 or 210 on either side of door 16.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A seal for use in conjunction with a roll-up door having a door surface and a door frame having a frame surface facing the door surface to define a seal space having a seal space width, the seal comprising:
   a coupling body comprising:
      a seating surface, a pair of opposed side surfaces extending from said seating surface, a longitudinal body axis extending from said seating surface between said pair of opposed side surfaces; and
      a plurality of securement ribs extending from each of said side surfaces, said plurality of securement ribs having a longitudinal extent defining a longitudinal rib axis, said longitudinal rib axis defining an acute angle with said longitudinal body axis, said acute angle opening opposite to said seating surface;
   a main sealing lobe extending from said coupling body substantially along said longitudinal body axis, said main sealing lobe having an arcuate cross-sectional profile defining a concave inner surface and an opposing convex outer surface such that said main sealing lobe is biased against the door surface when the roll-up door is closed, said main sealing lobe defining a main sealing lobe tip disposed at an end of a longitudinal extent of said main sealing lobe, opposite said coupling body; and
   a secondary sealing lobe spaced from said coupling body and extending outwardly from said convex outer surface of said main sealing lobe to define a secondary sealing lobe tip at a point spaced outwardly from said convex outer surface of said main sealing lobe, such that said main sealing lobe and said secondary sealing lobe cooperate to define an undeformed configuration having a seal width larger than the seal space width, whereby said secondary sealing lobe is biased against the frame surface when the main sealing lobe is biased against the door surface, said secondary sealing lobe comprising:
      a first lobe wall extending from said secondary sealing lobe tip to said main sealing lobe in a first direction toward said main sealing lobe tip; and
      a second lobe wall extending from said secondary sealing lobe tip to said main sealing lobe in a second direction toward said coupling body, wherein said secondary sealing lobe comprises a triangular cross-sectional profile, wherein said triangular cross-sectional profile includes an aperture formed therein, said first lobe wall and said second lobe wall cooperating with said main sealing lobe to bound said aperture, said first lobe wall deforming into a buckled configuration when said secondary sealing lobe is biased against the frame surface, in which said first lobe wall protrudes into said aperture.

2. The seal of claim 1, wherein said main sealing lobe defines a tapering thickness between said coupling body and said main sealing lobe tip.

3. The seal of claim 2, wherein said main sealing lobe increases in thickness from said main sealing lobe tip to said coupling body.

4. The seal of claim 1, wherein said first lobe wall defines a thickness substantially equal to said second lobe wall.

5. The seal of claim 1, wherein said main sealing lobe is adjacent to one of said side surfaces of said coupling body.

6. The seal of claim 1, wherein said coupling body and said main sealing lobe are monolithically formed from a material having a substantially uniform density.

7. The seal of claim 6, wherein said material comprises a rubber material formed from ethylene propylene diene monomer.

8. The seal of claim 1, wherein said pair of opposed side surfaces of said coupling body are tapered from said main sealing lobe toward said seating surface.

9. The seal of claim 1, wherein said seating surface defines a rounded cross-sectional profile.

10. A method of installing the seal of claim 1 into the door frame of the roll-up door of claim 1, the method comprising:
advancing the coupling body along a lateral direction, toward a sidewall of the roll-up door frame disposed along a lateral edge of the roll-up door; and
pressing the coupling body along the lateral direction into a seal receiving space formed in the roll-up door frame, such that the coupling body is captured in the seal receiving space formed in the roll-up door frame,
the main sealing lobe protruding outwardly from the seal receiving space into the seal space after said step of pressing the coupling body,
the main sealing lobe curved toward the door surface such that the main sealing lobe resiliently deforms to bias against the door surface when the roll-up door is placed in a closed position,
the secondary sealing lobe extending toward the frame surface, such that the secondary sealing lobe resiliently deforms to bias against the frame surface when the roll-up door is placed in the closed position.

11. The method of claim 10, further comprising closing the roll-up door such that the main sealing lobe resilient deforms in a first direction, and the secondary sealing lobe resiliently deforms in a second direction opposed to the first direction, such that the resilient deformation of the first and second seals urges one another into a sealed configuration.

12. The method of claim 10, wherein the seal receiving space is formed between a roller track of the roll-up door and the frame surface of the roll-up door frame.

13. The method of claim 10, further comprising uninstalling the seal by the steps of:
grasping the seal;
pulling the seal free from the seal receiving space along a direction substantially opposite from the lateral direction, said step of pulling the seal free requires more force than said step of pressing the body of the seal.

14. The seal of claim 1, wherein said first lobe wall is resiliently deformable upon contact of said secondary sealing lobe against the frame surface.

15. A seal arrangement comprising:
a door frame having a seal receiving space and an inner frame surface extending from a side of said seal receiving space;
a roll-up door moveable with respect to said door frame between an open position and a closed position, said roll-up door having an outer surface facing said inner frame surface when the roll-up door is in the closed position to define a seal space having a seal space width; and
a seal comprising:
a coupling body having a seating surface and a pair of opposed side surfaces extending from said seating surface with a longitudinal body axis extending from said seating surface between said pair of opposed side surfaces, the side surfaces defining an interference fit with said seal receiving space of said door frame;
a main sealing lobe extending from said coupling body substantially along said longitudinal body axis, said main sealing lobe having an arcuate cross-sectional profile defining a concave inner surface and an opposing convex outer surface, said main sealing lobe outwardly deformed to bias against said outer surface of said roll-up door when said roll-up door is in the closed position, said main sealing lobe defining a main sealing lobe tip disposed at an end of a longitudinal extent of said main sealing lobe, opposite said coupling body; and
a secondary sealing lobe spaced from said coupling body and extending outwardly from said convex outer surface of said main sealing lobe, a secondary sealing lobe tip at a point spaced outwardly from said convex outer surface of said main sealing lobe, such that said main sealing lobe and said secondary sealing lobe cooperate to define an undeformed configuration defining an undeformed seal width larger than the seal space width, such that said secondary sealing lobe is inwardly deformed to bias against a surface of said door frame facing said outer surface of said roll-up door when said main sealing lobe is outwardly deformed, whereby said main sealing lobe and said secondary sealing lobe form a pair of seals at the outer surface of the door and the inner frame surface respectively, said secondary sealing lobe comprising a first lobe wall extending from said secondary sealing lobe tip to said main sealing lobe in a first direction toward said main sealing lobe tip, and a second lobe wall extending from said secondary sealing lobe tip to said main sealing lobe in a second direction toward said coupling body,
said secondary sealing lobe comprises a triangular cross-sectional profile, said triangular cross-sectional profile including an aperture formed therein, said first lobe wall and said second lobe wall cooperating with said main sealing lobe to bound said aperture, said first lobe wall deforming into a buckled configuration when said secondary sealing lobe is biased against the frame surface, in which said first lobe wall protrudes into said aperture.

* * * * *